Patented Aug. 3, 1943

2,325,951

UNITED STATES PATENT OFFICE 2,325,951

POLYVINYL HALIDE COMPOSITION

Thomas L. Gresham, Akron, Ohio, assignor to The B. F. Goodrich Company, New York, N. Y., a corporation of New York No Drawing. Application March 9, 1940, Serial No. 323,222

6 Claims. (Cl. 260—36)

This invention relates to polyvinyl chloride compositions, and has as its principal object to provide plasticizers for polyvinyl chlorides which impart desirable properties to compositions in which they are employed.

Polyvinyl chlorides have found many useful applications because of their extraordinary resistance to oxidation, organic solvents, acids, alkalies, oils, and other deteriorating influences. Plasticizers are commonly included in the polyvinyl halides to increase their flexibility. Many ordinary plasticizers such as tricresyl phosphate function well at ordinary temperatures, but compositions plasticized with tricresyl phosphate rapidly lose their flexibility and become stiff and boardy at temperatures below freezing. To remedy this undesirable characteristic, dibutyl phthalate has been employed as a plasticizer, and it has been found that such compositions are considerably more flexible at low temperatures than compositions containing tricresyl phosphate. It has also been observed, however, that polyvinyl chlorides plasticized with dibutyl phthalate become discolored during the heat treatment required to mold them or after exposure to natural or artificial light for considerable periods of time, which darkening is apparently caused by some fundamental change in the composition. Compositions plasticized with dibutyl phthalate have also been somewhat deficient in electrical properties.

I have discovered that polyvinyl chloride compositions possessing improved dielectric properties, stability to heat and light, low-temperature flexibility and other desirable properties may be obtained by employing as the plasticizer, instead of dibutyl phthalate, higher dialkyl phthalates having the general formula

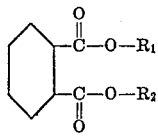

wherein $R_1$ and $R_2$ are alkyl radicals containing at least six and not more than twelve carbon atoms, and the sum of the carbon atoms contained in $R_1$ and $R_2$ is not more than eighteen. Any vinyl polymer made by polymerizing a monomeric material consisting essentially of vinyl chloride, including alpha, beta, or gamma polyvinyl chloride, or polyvinyl chloride compositions formed by the conjoint polymerization of vinyl chloride with a minor proportion of another polymerizable material which may be a vinyl ester of an aliphatic acid such as vinyl acetate or an ester of an acrylic acid such as methyl methacrylate or compounds such as vinyl cyanide or vinylidene chloride, may be plasticized with the dialkyl phthalates of this invention. The plasticizers of this invention are particularly useful in the gamma polyvinyl chloride compositions described in U. S. Patent No. 1,929,453 issued to Waldo L. Semon.

Although dialkyl phthalates in which the alkyl groups are straight chains such as di-n-hexyl phthalate, di-n-octyl phthalate, and lauryl hexyl phthalate may be employed, compounds in which branched-chain alkyl groups are present such as di(2 - ethylhexyl) phthalate, di(2 - ethylbutyl) phthalate, and 2 - ethylhexyl 2 - ethylheptyl phthalate are preferred. The compounds in which the alkyl groups are identical are preferred because they are more resistant to hydrolysis, although compounds of the class herein described wherein the alkyl groups are different produce compositions which are considerably more stable and have better dielectric properties than compositions plasticized with dibutyl phthalate.

The plasticizers of this invention may be incorporated in the composition by any of the well-known methods. For instance, gamma polyvinyl chloride may be mixed with approximately equal parts of plasticizer such as di(2-ethylhexyl) phthalate on a heated roll-mill or in an internal mixer, and the resulting composition may be molded by heating in a press for 20 min. at 287° F. The resulting resilient, rubber-like composition has even better low-temperature flexibility than compositions plasticized with dibutyl phthalate, and as compared with dibutyl phthalate, the dielectric properties and heat and light stability are outstanding. The compositions are also considerably more resistant to hot water than compositions prepared with dialkyl phthalates in which the alkyl groups are straight chains.

From one-half to four parts by weight of plasticizer are ordinarily combined with one part of polyvinyl chloride. Carbon black, clay, barytes, zinc oxide, and other pigments and fillers commonly used in the rubber and plastics industries may be included in the plasticized compositions. The plasticizers of this invention may be used in conjunction with other plasticizers, if desired. When compositions of exceptional stability are desired, basic stabilizers such as metallic oxides, lead salts, particularly lead silicate, triethanolamine, etc., may be incorporated in the compositions. The polyvinyl chlorides may also contain appreciable amounts of other polymers such as polyvinyl organic esters either conjointly polymerized therewith or incorporated therein after polymerization, although compositions in which the polymer consists essentially of a polyvinyl chloride, particularly the gamma polymer, are preferred.

While I have herein disclosed specific embodiments of my invention, I do not intend to limit the invention solely thereto, for it is obvious that many modifications including substituting equivalent materials and varying the proportions of materials used are within the spirit and scope of the invention as defined in the appended claims.

I claim:

1. A composition of matter comprising a vinyl polymer and a plasticizer having the general formula

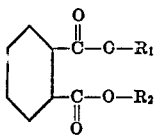

wherein $R_1$ and $R_2$ are branched-chain alkyl radicals containing at least six and not more than twelve carbon atoms, and the sum of the carbon atoms contained in $R_1$ and $R_2$ is not more than eighteen, the vinyl polymer being a product made by polymerizing a monomeric material of which the polymerizable constituent is essentially vinyl chloride.

2. A composition of matter comprising gamma polyvinyl chloride and di(2-ethylhexyl) phthalate.

3. A composition of matter consisting essentially of gamma polyvinyl chloride and a plasticizer having the general formula

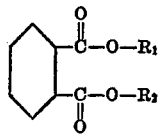

wherein $R_1$ and $R_2$ are branched-chain alkyl radicals containing at least six and not more than twelve carbon atoms, and the sum of the carbon atoms contained in $R_1$ and $R_2$ is not more than eighteen.

4. A composition as in claim 3 wherein $R_1$ and $R_2$ are identical branched-chain alkyl groups.

5. A composition of matter comprising a vinyl polymer and di(2-ethylhexyl) phthalate, the vinyl polymer being a product made by polymerizing a monomeric material of which the polymerizable constituent is essentially vinyl chloride.

6. A composition of matter consisting essentially of gamma polyvinyl chloride and di(2-ethylhexyl) phthalate.

THOMAS L. GRESHAM.